United States Patent Office 3,409,991
Patented Nov. 12, 1968

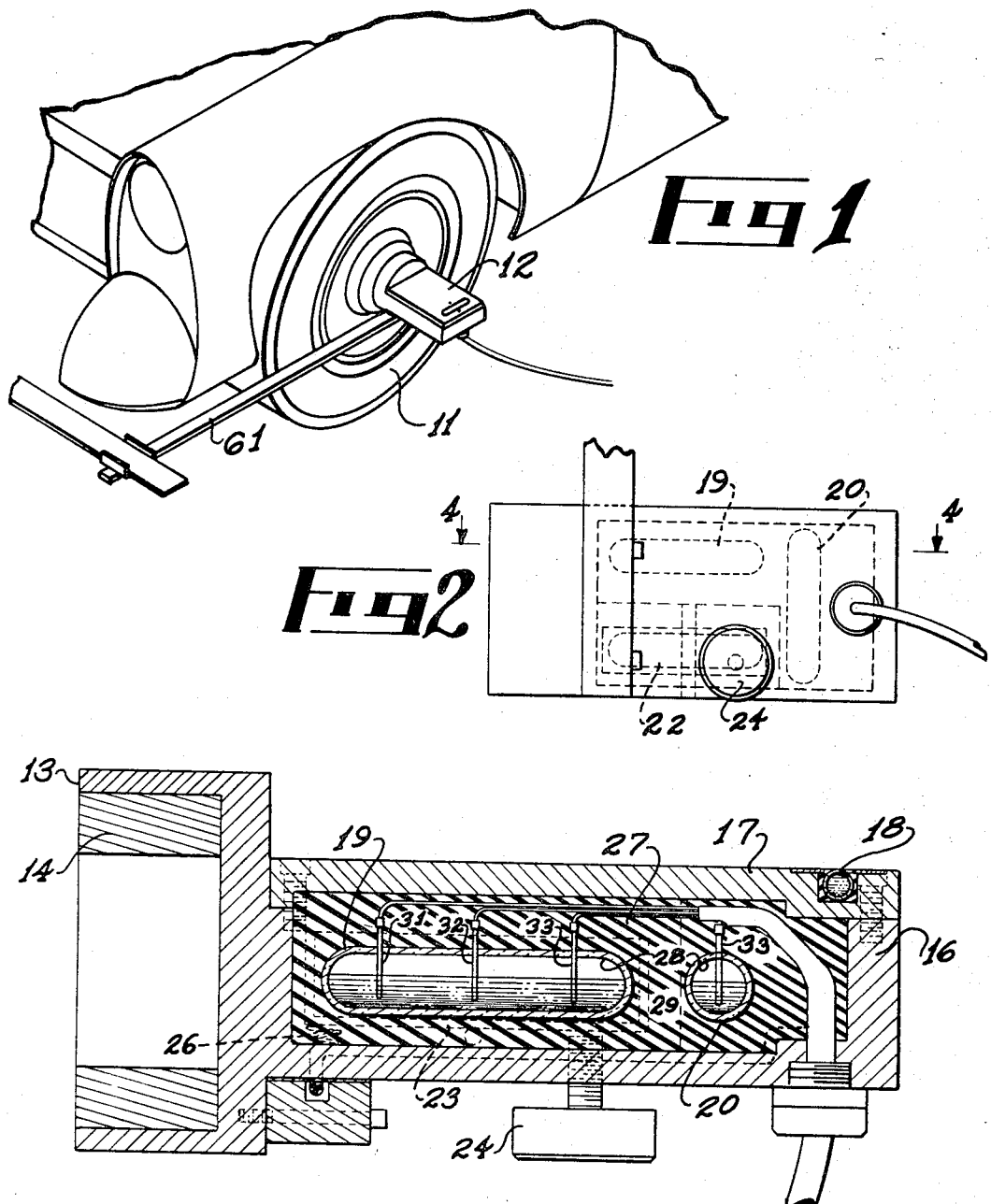

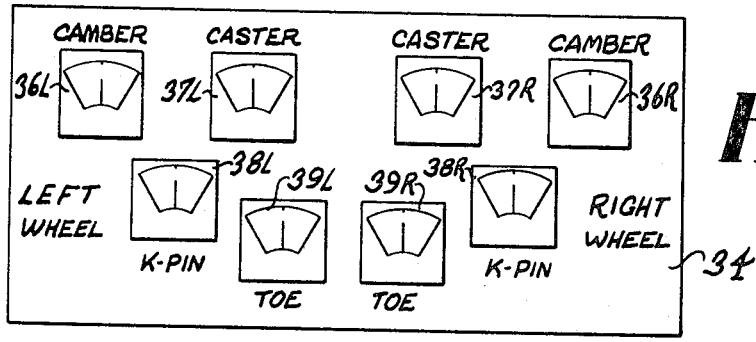
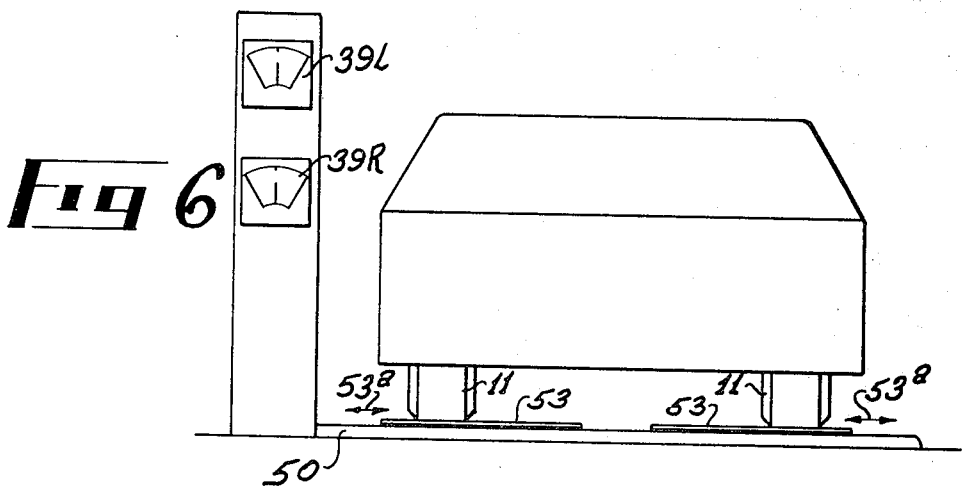
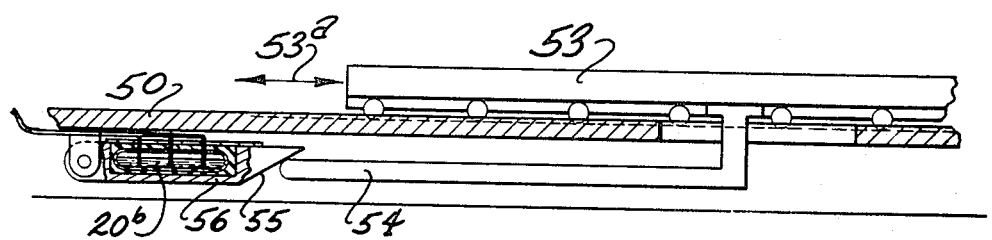

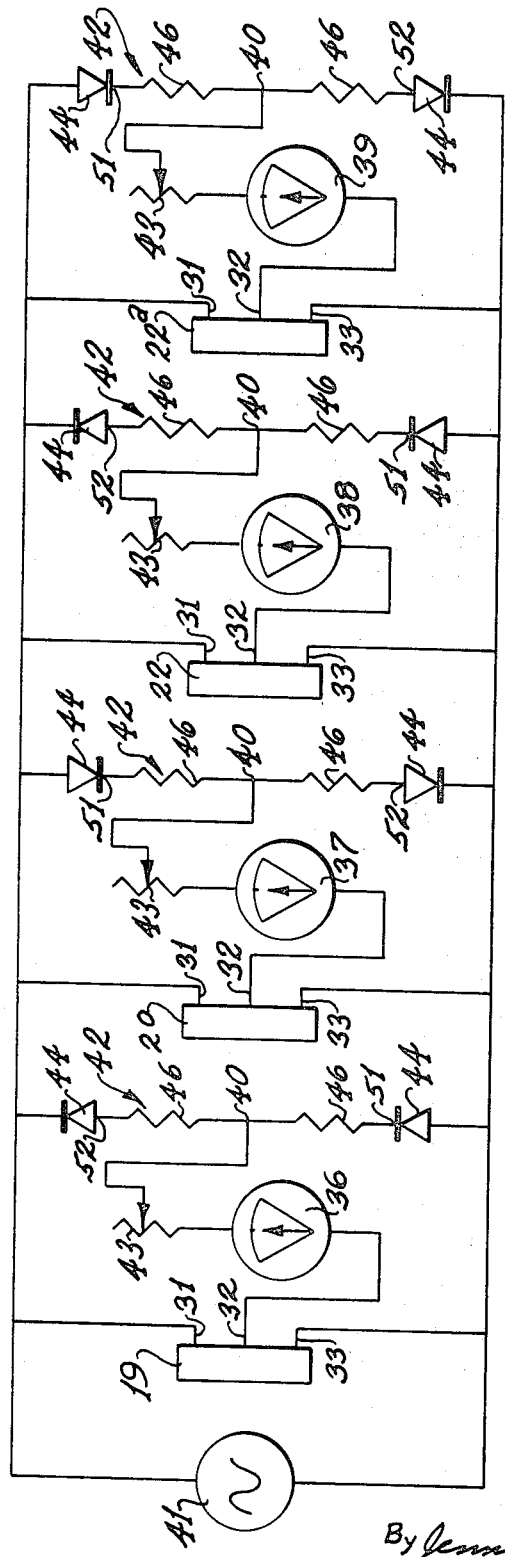

3,409,991
ELECTRONIC WHEEL ALIGNMENT APPARATUS
George G. Davis and Philip C. Davis, Birmingham, Ala.,
and Houston O. Bender, 2315 N. 26th St., Birmingham,
Ala. 35234; said George G. Davis and said Philip C.
Davis assignors to said Bender
Filed Nov. 22, 1965, Ser. No. 509,003
1 Claim. (Cl. 33—203.14)

ABSTRACT OF THE DISCLOSURE

A device for electronically measuring and displaying the alignment characteristics of the wheels of an automobile. A fluid level transducer is operatively connected to the wheel being tested and actuates a meter through an electric circuit so that the deflection of the meter indicates the alignment characteristics of the wheel.

---

This invention relates to wheel alignment equipment and has as its primary object provision of consistently accurate equipment for measuring wheel alignment characteristics. More particularly this invention relates to electronic equipment for measuring camber, caster, toe and king pin inclination.

A primary difficulty encountered in the wheel alignment art has been lack of consistency in readings made by one instrument and another, and in readings made at different times by the same instrument or by different instruments. Furthermore, the electronic measuring systems heretofore employed have been subject to malfunction due to changes in temperature, humidity and moisture conditions, as well as mechanical shock and similar characteristics of the environment in which these devices are used. Still further difficulty has been encountered because of the error inherent in prior art measuring equipment due to the impossibility of constructing two coils having exactly the same electrical properties. That is to say, the prior art devices with which we are familiar and which embody electronic techniques in measuring wheel alignment characteristics do so by means of matching the impedance of two or more coils of wire thereby obtaining a voltage reading.

To overcome the above and other difficulties we provide an electronic transducer included in an electric circuit which is particularly adapted to accurately measure angular deflection from a standard position, and which further includes means for varying the standard position to allow adjustment for use under various conditions.

Another object of our invention is to provide an electronic wheel alignment device that is completely sealed and therefore moisture and dust proof.

Still another object is to provide apparatus of the character designated that is not affected by mechanical shock and the like.

Very briefly our invention comprises means to engage automobile wheels, such means carrying the transducers referred to above, whereby a signal is generated by the electric circuit proportional to the alignment characteristics of the wheel. That is to say, for instance, the lateral drag of a wheel as it rolls forward over a plate would cause a signal to be generated in the circuit proportional to the magnitude of the lateral drag. The signal thus generated is displayed on a meter panel, or it may be utilized to operate other types of signal devices such as electric lamps or card printing circuits.

Apparatus illustrating features of our invention is shown on the accompanying drawings forming a part hereof, in which:

FIG. 1 is a perspective view showing the front and top of one embodiment of our invention in place on the front wheel of an automobile;

FIG. 2 is a bottom plan view of the apparatus illustrated in FIG 1;

FIG. 3 is a front elevational view of the meter panel used in association with the apparatus illustrated in FIG. 1;

FIG. 4 is a sectional view taken generally along the line 4—4 of FIG. 2;

FIG. 5 is a diagrammatic illustration of the circuit used in the apparatus illustrated in FIG. 1;

FIG. 6 is a front elevational view of another embodiment of our invention; and,

FIG. 7 is a detail view showing the mechanical arrangement of the embodiment illustrated in FIG. 6.

Referring now to the drawings we show the front wheel of an automobile at 11. A wheel gauge unit, indicated generally by the numeral 12 is secured to the wheel in such a manner as to assume a definite position in relation to the wheel. This may be accomplished by providing a machined surface 13 on the gauge which is held against the usual machined surface of the hub of the wheel, or by an adapter to the wheel as shown in FIGS. 1 and 4, by some means such as a magnetic chuck 14.

The gauge unit 12 comprises a body 16 having a top 17 bolted thereto. A level vial 18 is mounted in the top 17 whereby the operator is aided in properly positioning the gauge on the wheel. Fixedly mounted within the body 16 are two transducer elements 19 and 20. As shown clearly in FIG. 2, the transducer 19 is mounted generally parallel to the axis of the wheel and the transducer 20 is mounted generally perpendicular to the axis of the wheel. A third transducer 22 is carried in a cradle 23 which is in turn mounted for limited pivotal movement in the body 16. A thumb screw 24 is provided for adjusting the position of the cradle 23 while a light spring 26 biases the cradle against the end of the thumb screw. It will be noted that the transducers are surrounded by a resilient material indicated by the numeral 27, whereby they are protected from mechanical shock such as might occur if the gauge were to be dropped.

The transducers proper each comprise a sealed cavity 18 containing a definite quantity of an electrolytic fluid indicated at 29. The fluid may be any convenient fluid having definite measurable and known dielectric characteristics which are substantially constant. Each transducer is provided with three spaced apart electrodes 31, 32, and 33, which extend into the fluid, as shown in FIG. 4.

From the foregoing it will be understood that with the gauge 12 mounted or secured to the wheel as shown, with the level 18 zeroed, the surfaces of the fluid 29 within the transducer cavities 28 assume a level position, thus causing the electrodes 31, 32, and 33 of each transducer to be immersed in the fluid in greater or lesser amounts, depending upon the angle of the axis of the wheel and the tilt of the wheel itself. Thus, as will be more fully described hereinafter, a voltage impressed across the electrodes will be effected by the relative amounts that the electrodes are immersed in the fluid, thereby accurately reflecting the position of the wheel and the value of its alignment characteristics.

In FIG. 3 we show a display panel 34 on which are mounted the meters whose readings reflect the alignment characteristics of the wheel. The usual installation will have one wheel gauge unit 12 for each front wheel of an automobile, and will measure king pin inclination and camber, and caster. Some units will also have provision for measuring the amount of toe. This is shown generally at 61 in FIG. 1. Thus the display panel 34 will ordinarily have eight meters mounted thereon, meters number 36L, 37L, 38L and 39L, respectively, measure the camber, caster, king pin and toe characteristics of the left wheel, while meters 36R, 37R, 38R and 39R, respectively, measure the camber, caster, king pin and toe characteristics of the right wheel.

Referring now to the diagram of FIG. 5 we will describe the general configuration and operation of the circuit which includes the transducers 19, 20, 22 and 22ª of the embodiment illustrated in FIGS. 1 through 4. It will be noted that transducer 22a provides a "toe" reading. Best economic utilization of the current supply is obtained when the circuit units to be described hereinafter are utilized in pairs as shown. The transducers 19, 20, 22 and 22ª are connected parallel across the terminals of a voltage source indicated generally by the numeral 41. Also connected parallel across the terminals of the voltage source 41 and associated with each of the transducers 19, 20, 22 and 22ª are sub-circuits indicated generally by the numeral 42. Connected between each of the sub-circuits 42 and the center tap 32 of each transducer 19, 20, 22 and 22ª respectively are meters 36, 37, 38 and 39. A resistance element 43 is connected in series with each of the meters 36, 37, 38 and 39 to facilitate calibration thereof. The sub-circuits 42 each comprise a pair of diodes 44 connected in series, between which the meter circuit including the resistor 43 is connected at a point indicated by the numeral 40. The diodes 44 are aligned as shown whereby a half cycle of the current from the power supply 41 passes through each sub-circuit 42. Balancing resistors 46, which may or may not be variable may be connected between the diodes 44 on either side of the point of connection 40 of the meter as current limiters.

The transducers are, in effect, substantially constant impedance elements parallel with the power supply 41. However, they operate as a pair of complementary variable impedances between each side of the power supply and one terminal of the meter. That is to say, between the electrodes 31 and 33 the transducer is a substantially constant impedance element, whereas between electrodes 31 and 32 and electrodes 33 and 32 the transducer comprises a pair of complementary variable impedances. The sum of the impedance of the transducer between the electrodes 31 and 32 and the impedance of the transducer between the electrodes 33 and 32 is substantially constant and equal to the total impedance between the electrodes 31 and 33.

In operation, an alternating current from the power supply 41 is impressed across the terminals 31 and 33 of the transducer. A half cycle of the current from the power supply 41 passes through the diodes 44, the voltage drop from a point 51 to the point 40 being equal to the voltage drop between the point 40 and a point 52. When the transducer is level, that is to say the electrodes 31, 32 and 33 are immersed in the fluid in the transducer to an equal depth, whereby the surface contacted by the fluid on each of the electrodes is the same, the impedance between the electrodes 31 and 32 equals the impedance between the electrodes 33 and 32, thus the voltage drop across the transducer from the electrode 31 to the electrode 32 equals the voltage drop across the transducer from the electrode 33 to the electrode 32 and the circuit is in balance, and the meter 36 shows a zero reading.

When the transducer is not level one of the electrodes 31 and 33 is immersed in the fluid to a greater amount than the other, thus placing the circuit in an unbalanced condition whereby current flows between the point 40 and the electrode 32 through the meter which gives a reading. The voltage between the point 40 and the electrode 32 is proportional to the voltage difference between the electrodes 31 and 32 and the electrodes 33 and 32, and therefore is proportional to the relative position of the transducer. This voltage is detected and displayed by the meter. It will be understood that the meters are calibrated in terms of the characteristics to be measured.

From the foregoing it is clear that with the gauge unit 12 fixed to the wheel as described above and with the appropriate preparatory operations which are well known in the art having already been performed, such as checking tire pressure and so forth, the angle of inclination of the wheel from the vertical with the car at rest and the tires straight ahead, that is to say, camber, will be detected by the transducer 19 and will be read directly from the meter 36L or 36R depending upon whether it is the right wheel or left wheel being checked. King pin inclination is measured by turning the wheel under consideration an angle of twenty degrees toward the center of the car, adjusting the gauge 12 so that the spirit level 18 reads zero, and then turning the wheel through an angle of forty degrees, that is to say, until it is turned twenty degrees outwardly from the center of the car, whereupon the angle which is known as the king pin inclination will be detected by the transducer 20 and will appear on the appropriate meter 38 on the meter panel 34. Similarly caster is detected by the transducer 22, the wheel being turned twenty degrees inwardly toward the center of the car and the meter zeroed by turning the thumb screw 24. That is to say thumb screw 24 is turned to adjust the position of the cradle 23 which carries the transducer 22 until the reading on the meter 37 is zero. This adjustment can be made electronically by providing a manually variable resistor in series with the transducer or in series with the diodes whereby the circuit is adjusted to cause the meter 37 to give a zero reading when the transducer 22 is not level. Then the wheel is turned through an angle of forty degrees, that is to say, twenty degrees outwardly from the center of the car and the angle detected by the transducer 22 is the caster angle. Transducer 22ª may be employed to provide toe readings in those installations which include means to measure this characteristic.

Referring now to FIGS. 6 and 7 which show another embodiment of our invention, we show a pair of wheel engaging treadles 53 in position for the front wheels 11 of an automobile to roll thereover. The treadles are free to move laterally as indicated by the arrow 53ª. Lateral movement is imparted to each treadle 53 when a wheel rolls over it. This is caused by a lateral drag or scuffing motion of the wheel or tire when the alignment of the wheel is improper particularly when the toe angle is incorrect or there is excessive camber. Operatively connected to the treadle 53 is a cam actuating member 54 which operates against a cam surface 55. The cam surface 55 is carried by a cradle member 56 which is pivotally secured to the frame 50 of the scuff gauge. Carried within this cradle is transducer 20ᵇ of the type hereinbefore described. Thus when the treadle 53 is moved laterally the cam structure just described tilts the transducer, the amount of tilt being proportional to the amount of lateral movement, which in turn is proportional to the lateral drag of the wheel. Thus an electrical signal proportional to the lateral drag is produced and may be read on an electrical meter as hereinbefore described. Meter 39L in FIG. 6 responds to the movement of the left wheel and 39R responds to the right wheel. The signal may also be utilized to operate any one of several signalling or readout devices such as, for instance, punch card apparatus and the like.

The electric circuit employed is a highly flexible circuit which can be used with a standard 110 volt line current, or with minor changes with any other source of alternating current. The output of the circuit is proportional to the difference between the position of the transducer and a standard position. That is to say, the circuit produces a DC signal that is proportional to the attitude of the transducer, and which may be applied to control any type of electric equipment such as a meter or servomechanism, or other signaling devices. The embodiments illustrated herein show a DC microammeter which indicates not only the magnitude of the current passing therethrough, but also polarity thereof.

From the foregoing it is seen that we have devised a new and highly electronic wheel alignment characteristic measuring device which is sensitive, accurate and durable.

It is relatively inexpensive to produce, easy to install, and simple and accurate in operation. Because of the durability of the construction of the unit itself and the relative simplicity of the electronic circuit maintenance of our device is reduced to an absolute minimum.

While we have shown our invention in but two forms, it will be obvious to those skilled in the art that it is not so limited, but is susceptible of various changes and modifications without departing from the spirit thereof, and we desire, therefore, that only such limitations shall be placed thereupon as are specifically set forth in the appended claim.

What we claim is:

1. Apparatus for testing automobile wheel alignment characteristics which comprises:
    (a) at least one vial containing a fluid having predetermined electrical characteristics,
    (b) three electrodes carried by said vial, each being partly immersed in said fluid to provide two outer electrodes and a center electrode,
    (c) an electric circuit including a source of alternating current and at least one pair of diodes aligned in series to pass current in one direction and connected across said source,
    (d) one of said outer electrodes being connected to one side of said source and the other of said outer electrodes being connected to the other side of said source,
    (e) a direct current read-out device having one side connected between said diodes and having its other side connected to said center electrode,
    (f) a treadle in position to have an automobile wheel roll thereover,
    (g) a cradle carrying said vial and being pivoted at one end and having a cam surface at the other end, and
    (h) a push rod directly connected to said treadle and operating against the cam surface of said cradle to impart to the vial an angular displacement proportional to the wheel alignment characteristics of the wheel, thereby operating said read-out device.

References Cited

UNITED STATES PATENTS

| | | | |
|---|---|---|---|
| 1,506,192 | 8/1924 | Meijer | 33—206.5 |
| 2,007,565 | 7/1935 | Duby | 33—203.14 |
| 2,765,540 | 10/1956 | MacMillan et al. | 33—203.18 |
| 3,071,863 | 1/1963 | MacMillan | 33—203.18 |
| 3,096,591 | 7/1963 | Higgins et al. | 33—206.5 |
| 3,252,224 | 5/1966 | Taylor | 33—203.12 |
| 3,290,786 | 12/1966 | Parkin | 33—206.5 |

FOREIGN PATENTS 665,628   1/1962   Great Britain.

WILLIAM D. MARTIN, Jr., *Primary Examiner.*